(12) United States Patent
Gauvreau, Jr.

(10) Patent No.: US 12,147,978 B2
(45) Date of Patent: Nov. 19, 2024

(54) BLOCKCHAIN-BASED DOMAIN NAME REGISTRAR AND MANAGEMENT SYSTEM

(71) Applicant: 3DNS, INC., Dover, DE (US)

(72) Inventor: Paul Richard Gauvreau, Jr., Rancho Santa Fe, CA (US)

(73) Assignee: 3DNS, INC., Dover, DE (US)

( * ) Notice: Subject to any disclaimer, the term of this patent is extended or adjusted under 35 U.S.C. 154(b) by 0 days.

(21) Appl. No.: 18/339,721

(22) Filed: Jun. 22, 2023

(65) Prior Publication Data
US 2024/0095733 A1    Mar. 21, 2024

Related U.S. Application Data

(60) Provisional application No. 63/408,826, filed on Sep. 21, 2022.

(51) Int. Cl.
*G06Q 20/38* (2012.01)
*G06Q 20/36* (2012.01)
(Continued)

(52) U.S. Cl.
CPC ....... *G06Q 20/389* (2013.01); *G06Q 20/3672* (2013.01); *H04L 61/302* (2013.01);
(Continued)

(58) Field of Classification Search
None
See application file for complete search history.

(56) References Cited

U.S. PATENT DOCUMENTS 10,721,060 B1    7/2020    Kaizer et al.
11,196,573 B2    12/2021    Roennow et al.
(Continued)

FOREIGN PATENT DOCUMENTS

CN    106161674 A  *  11/2016
CN    109714447 B      9/2021
(Continued)

OTHER PUBLICATIONS

B. Rajendran, G. Palaniappan, D. R, B. B. S and S. S D, "A Universal Domain Name Resolution Service—Need and Challenges—Study on Blockchain Based Naming Services," 2022 IEEE Region 10 Symposium (TENSYMP), Mumbai, India, 2022, pp. 1-6, doi: 10.1109/TENSYMP54529.2022.9864361. (Year: 2022).*
(Continued)

*Primary Examiner* — Patrick McAtee
*Assistant Examiner* — Eduardo Castilho
(74) *Attorney, Agent, or Firm* — NICHOLSON DE VOS WEBSTER & ELLIOTT LLP

(57) ABSTRACT

A nameserver receives a request to access a webpage from a client device. The nameserver generates a blockchain query based on the request for querying a domain registrar blockchain storing domain name registration data in smart contracts. The nameserver sends the first blockchain query to the domain registrar blockchain. In response to receiving a nameserver identifier from the domain registrar blockchain, the nameserver retrieves a DNS record for the webpage using the received nameserver identifier. The nameserver then provides information from the retrieved DNS record to the client device to allow the client device to access the webpage.

18 Claims, 11 Drawing Sheets

US 12,147,978 B2

Page 2

(51) Int. Cl.
*H04L 61/3015* (2022.01)
*H04L 61/4511* (2022.01)
*H04L 61/4552* (2022.01)

(52) U.S. Cl.
CPC ...... *G06Q 2220/00* (2013.01); *H04L 61/4511* (2022.05); *H04L 61/4552* (2022.05)

(56) References Cited

U.S. PATENT DOCUMENTS

| | | | | |
|---|---|---|---|---|
| 11,558,344 | B1* | 1/2023 | Pezeshki | H04L 61/5007 |
| 11,632,236 | B1* | 4/2023 | Kaizer | G06F 16/2379 |
| | | | | 713/173 |
| 11,700,230 | B1* | 7/2023 | Osterweil | H04L 61/10 |
| | | | | 709/245 |
| 11,797,655 | B1* | 10/2023 | Kaizer | G06Q 20/3678 |
| 2004/0249939 | A1 | 12/2004 | Amini | |
| 2005/0235031 | A1 | 10/2005 | Schneider | |
| 2006/0218289 | A1* | 9/2006 | Assad | H04L 61/3015 |
| | | | | 709/229 |
| 2013/0114432 | A1 | 5/2013 | Haynes | |
| 2017/0134937 | A1* | 5/2017 | Miller | G06Q 20/06 |
| 2020/0127965 | A1 | 4/2020 | Oron et al. | |
| 2020/0403961 | A1* | 12/2020 | Gaydos | H04L 61/10 |
| 2021/0158338 | A1* | 5/2021 | Lee | G06Q 20/223 |
| 2021/0266163 | A1* | 8/2021 | Zeng | G06F 16/2315 |
| 2022/0174031 | A1* | 6/2022 | Davis | H04L 63/1483 |
| 2022/0222245 | A1* | 7/2022 | Pezeshki | G06F 16/2379 |
| 2022/0376889 | A1* | 11/2022 | Kaizer | H04L 9/008 |
| 2022/0376925 | A1* | 11/2022 | Kaizer | G06F 16/27 |
| 2023/0008228 | A1* | 1/2023 | Kasimov | G06F 16/958 |
| 2023/0252431 | A1* | 8/2023 | Mecci | G06Q 20/065 |
| | | | | 705/44 |

FOREIGN PATENT DOCUMENTS

| | | | | |
|---|---|---|---|---|
| CN | 113422767 | A * | 9/2021 | |
| FR | 3100677 | A1 * | 3/2021 | G06Q 40/04 |
| KR | 10-2019-0132120 | A | 11/2019 | |
| KR | 10-2020-0048458 | A | 5/2020 | |
| KR | 10-2021-0125381 | A | 10/2021 | |
| KR | 10-2409982 | B1 | 6/2022 | |
| WO | 2018191882 | A1 | 10/2018 | |
| WO | WO-2021237941 | A1 * | 12/2021 | H04L 61/103 |

OTHER PUBLICATIONS

B. Benshoof, A. Rosen, A. G. Bourgeois and R. W. Harrison, "Distributed Decentralized Domain Name Service," 2016 IEEE International Parallel and Distributed Processing Symposium Workshops (IPDPSW), Chicago, IL, USA, 2016, pp. 1279-1287, doi: 10.1109/IPDPSW.2016.109. (Year: 2016).*
K. K. Halim and M. Zuhri Catur Candra, "Dicey: A Blockchain Based Decentralized Service Registry," 2019 International Conference on Data and Software Engineering (ICoDSE), Pontianak, Indonesia, 2019, pp. 1-6, doi: 10.1109/ICoDSE48700.2019.9092733. (Year: 2019).*
J. Choncholas, K. Bhardwaj and A. Gavrilovska, "The Performance Argument for Blockchain-based Edge DNS Caching," 2021 IEEE/ACM Symposium on Edge Computing (SEC), San Jose, CA, USA, 2021, pp. 312-318, doi: 10.1145/3453142.3491288. (Year: 2021).*
M. Caldeira and M. Correia, "Blockchain Address Transparency with DNS," 2021 IEEE Symposium on Computers and Communications (ISCC), Athens, Greece, 2021, pp. 1-7, doi: 10.1109/ISCC53001.2021.9631542. (Year: 2021).*
Z. Li, S. Gao, Z. Peng, S. Guo, Y. Yang and B. Xiao, "B-DNS: A Secure and Efficient DNS Based on the Blockchain Technology," in IEEE Transactions on Network Science and Engineering, vol. 8, No. 2, pp. 1674-1686, 2021, doi: 10.1109/TNSE.2021.3068788. (Year: 2021).*
Docs.Ens. Domains, "Ethereum Name Service—Technical documentation," retrieved on Nov. 29, 2021 from https://web.archive.org/web/20211129154243/https://docs.ens.domains/ , 2021, (Year: 2021).*
Nick Johnson, "EIP-137: Ethereum Domain Name Service—Specification," Ethereum Improvement Proposals, No. 137, 2016, Available: https://eips.ethereum.org/EIPS/eip-137. Retrieved on Dec. 1, 2021 from https://web.archive.org/web/20211201090822/https://eips.ethereum.org/EIPS/eip-137 (Year: 2021).*
Phyrex Tsai et al., "EIP-1062: Formalize IPFS hash into ENS(Ethereum NameService) resolver [DRAFT]," Ethereum Improvement Proposals, No. 1062, 2018, Available on https://eips.ethereum.org/EIPS/eip-1062. Retrieved from https://web.archive.org/web/20211129154243/https://docs.ens.domains/ on Dec. 1, 2021 (Year: 2018).*
Handshake.org Whitepaper, 2021, retrieved from https://web.archive.org/web/20210203191840/https://handshake.org/files/handshake.txt on Feb. 3, 2021 (Year: 2021).*
C. Patsakis, F. Casino, N. Lykousas and V. Katos, "Unravelling Ariadne's Thread: Exploring the Threats of Decentralised DNS," in IEEE Access, vol. 8, pp. 118559-118571, doi: 10.1109/ACCESS.2020.3004727. (Year: 2020).*
Millegan, "Step-by-Step Guide to Importing a DNS Domain Name to ENS," retrieved from https://web.archive.org/web/20210928145336/https://medium.com/the-ethereum-name-service/step-by-step-guide-to-importing-a-dns-domain-name-to-ens-d2d15feb03e8 (Year: 2021).*
N. Scaife, H. Carter and p. Traynor, "OnionDNS: A seizure-resistant top-level Domain," 2015 IEEE Conference on Communications and Network Security (CNS), Florence, Italy, pp. 379-387, doi: 10.1109/CNS.2015.7346849. (Year: 2015).*
N. Scaife, H. Carter and p. Traynor, "OnionDNS: A seizure-resistant top-level Domain," 2015 IEEE Conference on Communications and Network Security (CNS), Florence, Italy, 2015, pp. 379-387, doi: 10.1109/CNS.2015.7346849 (Year: 2015).*
Y. Li and S. Xu, "Design and Implementation of a Scalable Distributed DNS System," 2021 IEEE 6th International Conference on Computer and Communication Systems (ICCCS), Chengdu, China, 2021, pp. 528-535, doi: 10.1109/ICCCS52626.2021.9449106. ( Year: 2021).*
Michael Dooley; Timothy Rooney, "Securing Authoritative DNS Data," in DNS Security Management , IEEE, 2017, pp. 169-186, doi: 10.1002/9781119328292.ch9. (Year: 2017).*
X. Duan, Z. Yan, G. Geng and B. Yan, "DNSLedger: Decentralized and distributed name resolution for ubiquitous IoT," 2018 IEEE International Conference on Consumer Electronics (ICCE), Las Vegas, NV, USA, 2018, pp. 1-3, doi: 10.1109/ICCE.2018.8326118. (Year: 2018).*
International Search Report and Written Opinion, PCT App. No. PCT/US2023/074781, Jan. 18, 2024, 10 pages.
Nick Johnson, ENS Documentation, Release 0.1, Mar. 30, 2019. (captured on the Internet Archive, Dec. 13, 2019) https://buildmedia.readthedocs.org/media/pdf/ens/latest/ens.pdf, 39 pages.
Brantly Millegan, "ENS Now Supports Tor Onion Address Resolution," Aug. 13, 2019 (captured on the Internet Archive, Aug. 15, 2019). https://medium.com/the-ethereum-name-service/ens-now-supports-tor-onion-address-resolution-9bb3bdff6217, 5 pages.

* cited by examiner

BLOCKCHAIN-BASED DOMAIN NAME REGISTRAR AND MANAGEMENT SYSTEM

CROSS-REFERENCE TO RELATED APPLICATIONS

This application claims the benefit of U.S. Provisional Application No. 63/408,826, filed Sep. 21, 2022, which is hereby incorporated by reference.

FIELD

Embodiments of the invention relate to the field of data storage using blockchains; and more specifically, to a blockchain-based domain name registrar.

BACKGROUND

The domain name system is a naming system for computing devices and resource (e.g., webpages) on the internet. The domain name system utilizes Internet Protocol (IP) addresses that are assigned to computing devices and resources that allow them to be identifiable and reachable for communications, exchanging data, etc. One important aspect of the domain name system is the storing of domain names and their corresponding IP addresses. This allows users to access a desired webpage using a web address (e.g., URL), rather than requiring users to memorize the specific numerical values of the IP address corresponding to the desired webpage. When a domain name is registered with a domain name registrar, the registrar can provide domain name resolution services for the domain name. Thus, when a user requests a webpage (e.g., by providing a URL in a browser application), a domain name resolution process is performed to identify the corresponding IP address and return the address to the browser application. The domain name resolution process can include multiple recursive steps that query nameserver databases to locate the DNS record that includes the IP address.

SUMMARY

Introduced here are techniques/technologies that allow a blockchain-based domain name registrar and management system to convert domain names and their corresponding DNS records into on-chain assets that are stored and managed directly on a blockchain. The blockchain-based registrar system uses smart contracts, on the Ethereum network, to support the features and functions required by the Internet Corporation for Assigned Names and Numbers (ICANN) to be an accredited domain registrar. More specifically, the blockchain-based registrar system supports full feature parity with traditional web2 registrars, allowing for new domain names to be registered and existing domain names to be transferred and renewed.

A nameserver of blockchain-based domain name registrar and management system receives a first request from a client device to access a webpage. The nameserver generates a blockchain query based on the request for querying a domain registrar blockchain. The domain registrar blockchain stores domain name registration data in smart contracts. The nameserver sends the blockchain query to the domain registrar blockchain. The domain registrar blockchain checks the smart contracts to determine whether the requested domain name is stored on the domain registrar blockchain and retrieves a nameserver identifier. The nameserver identifier is used to retrieve a DNS record for the webpage and information from the retrieved DNS record (e.g., an IP address) is provided to the client device.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
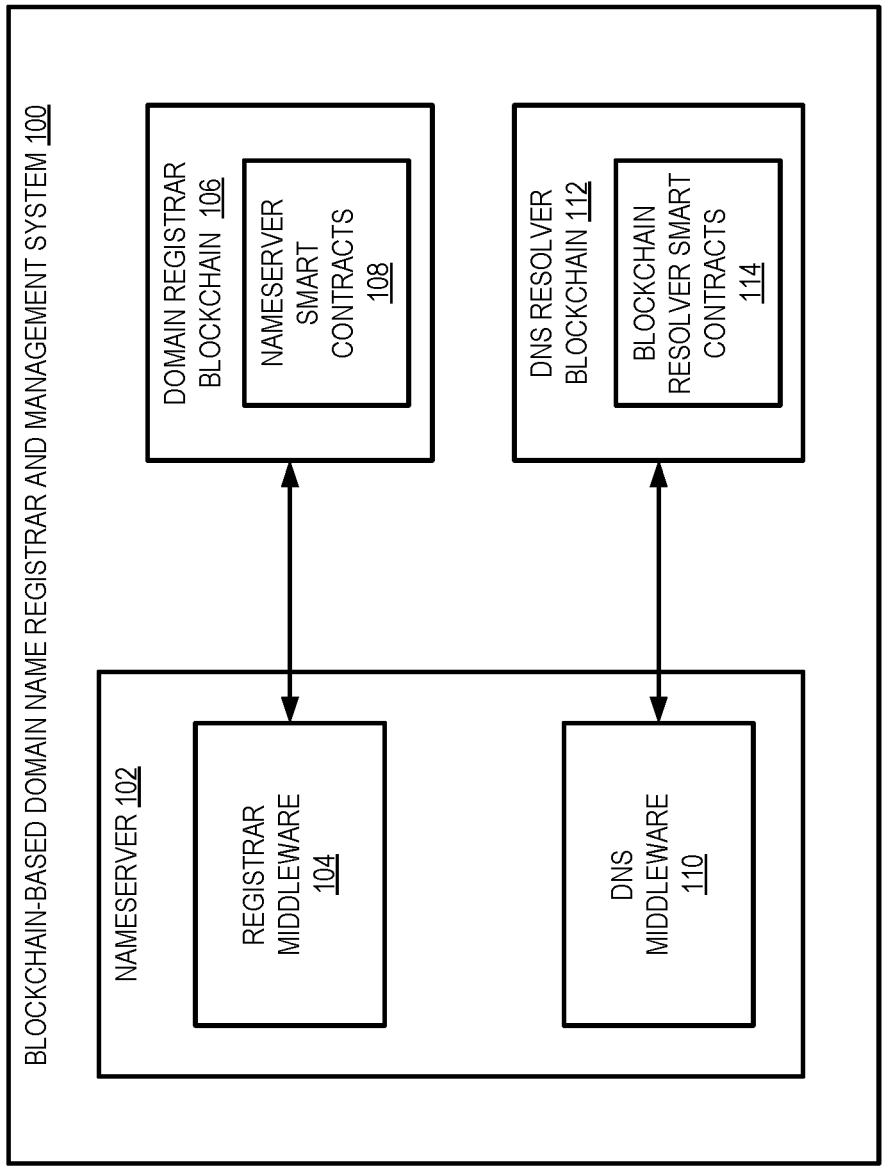
FIG. 1 illustrates a blockchain-based domain name registrar and management system according to some embodiments described herein.

Embodiments of the present disclosure include a blockchain-based domain name registrar and management system. The blockchain serves as a key infrastructure layer for performing distributed computation across a trustless network. Using smart contracts, any set of parties can perform trustless interactions with one another off a predefined set of rules. Actions that occur on-chain are fully auditable, immutable, and cryptographically administered. Blockchains are decentralized systems that allow for heightened security and direct ownership/administration of assets. The blockchain-based domain name registrar and management system can perform operations and processes using blockchain queries and transactions, including registering, renewing, and transferring domain names, and resolving DNS record requests.

Traditional domain name registrars manage the registration of domain names by maintaining domain name registration information in centralized databases. Typical disadvantages of using centralized databases include introducing a single point of failure. In addition, centralized databases typically have over privileged administrators, inability to prove and verify the integrity of data, and a lack of auditable trails.

To address the deficiencies in conventional systems, the blockchain-based domain name registrar and management system of the present disclosure stores domain name registration information and DNS records in a blockchain. Since domain names and their corresponding DNS records are all stored on-chain, the blockchain-based domain name registrar uses "wrapper" middleware services to translate and convert traditional nameserver requests into blockchain queries.

Embodiments describe herein provide many technical advantages and improvements, in addition to addressing the deficiencies of previous solutions. By adhering to ICANN requirements, the blockchain-based domain name registrar and management system uses the security and finality guarantees of blockchain transactions to administer and facilitate the management of domain names, while maintaining their interoperability with traditional systems. For example, using serverless middleware services to translate and convert traditional nameserver requests into blockchain queries abstracts away the complexities of interfacing with smart contracts and provides an interface structured as a standard nameserver. This allows the blockchain-based domain name registrar to be queried using requests structured as if they will be process by traditional database-based domain name registrars.

Further, a blockchain-based domain name registrar and management system can provide the benefits of using a blockchain to store DNS records and resolve requests. For example, the decentralized approach to registering and resolving domain names and DNS records using the blockchain-based domain name registrar and management system provides a fully transparent, auditable, and cryptographically secure domain name registration system. A blockchain-based domain name registrar further allows current DNS records, historical versions, and administrative actions to be publicly accessible. Unlike traditional systems, resolving DNS records for on-chain domains does not require access to any centralized services provided by the administering registrar, but can instead be resolved directly by the user themselves. Transacting on top of domains does not require a third party but can be performed directly on-chain due to the composable nature of the assets. The blockchain-based registrar further increases the composability and interoperability of the domain name by issuing it on-chain.

Further, a blockchain-based domain name can have the benefits of real-time transfers and settlement guarantees. For example, because the registration of a domain name in the domain registrar blockchain is tied to an on-chain asset (e.g., a token or NFT) stored in a digital wallet of the owner of the domain, the domain name can be transferred to another person by transferring the on-chain asset from the digital wallet of the owner to a new owner's digital wallet. Once the on-chain asset is in the new owner's digital wallet, only the new owner has administrative capabilities for the domain.

FIG. 1 illustrates a blockchain-based domain name registrar and management system according to some embodiments described herein. The blockchain-based domain name registrar and management system 100 illustrated in FIG. 1 includes a nameserver 102, a blockchain that operates a domain registrar blockchain 106, and a blockchain that operates a DNS resolver blockchain 112. The domain registrar blockchain 106 is a blockchain that operates a domain registrar and the DNS resolver blockchain 112 is a blockchain that operates a DNS resolver.

In some embodiments, the nameserver 102 is an authoritative name server configured and authorized to receive requests for domain names and transmit IP addresses in response. In the embodiment of FIG. 1, the nameserver 102 includes registrar middleware 104 and DNS middleware 110 as separate modules/components. In other embodiments, the registrar middleware 104 and the DNS middleware 110 are a single module/component of nameserver 102.

In one embodiment, registrar middleware 104 is an intermediary configured to receive requests from client devices. In embodiments, the registrar middleware 104 is further configured to translate received requests into blockchain queries for querying the domain registrar blockchain 106. Example requests received by the registrar middleware 104 can include requests to access/retrieve a webpage, send an email, register a new domain name, renew a domain name, transfer a domain name off or onto the domain registrar blockchain 106, etc. In one embodiment, the DNS middleware 110 is an intermediary configured to receive and translate DNS requests into blockchain queries for querying the DNS resolver blockchain 112 and returning IP addresses from DNS records. In embodiments, the purpose of the registrar middleware 104 and the DNS middleware 110 is to maintain the link between the information for a domain name stored off-chain and the information for the domain name in the domain registrar blockchain 106

In embodiments, the registrar middleware 104 and DNS middleware 110 allow the blockchain-based domain name registrar and management system 100 to store domain names and DNS records to blockchains (e.g., domain registrar blockchain 106 and DNS resolver blockchain 112) using on-chain assets (e.g., tokens or NFTs). For example, while the domain name registration process involves off-chain operations (e.g., process with ICANN, registering the nameserver with a top-level registry, etc.), when a domain name is registered to the domain registrar blockchain 106, an on-chain asset can be minted and added to a digital wallet of the user who registered the domain name.

The on-chain asset functions as the controller/master of the domain name for the blockchain-based domain name registrar and management system 100. In embodiments, as the on-set asset is stored in the holder's digital wallet, possession of the on-chain asset grants the holder of the on-chain asset exclusive administrative control/permission over the domain name corresponding to the on-chain asset. For example, any changes to a DNS record for a domain names stored in the DNS resolver blockchain 112 can only be performed by the owner of the on-chain asset associated with the domain name. To update a DNS record in the DNS resolver blockchain 112, a request can include the owner's digital wallet address to indicate that the request is from the owner of the on-chain asset. In contrast, traditional database-based domain registrars have control over domain names stored in their centralized databases, such that while a user can contact a traditional domain registrar to reset credentials, modify DNS records, etc., the traditional domain registrar has ultimate control over whether the perform the request action(s). For example, a request to change a DNS records can be sent to the traditional domain registrar, the traditional domain registrar determines whether to fulfill the request.

In one embodiment, the on-chain asset can be transferred from one user to another user (e.g., via on-chain transactions between digital wallets). Once transferred, the new owner of the on-chain asset becomes the controller/master of the domain name and is the only identity that can make changes to the DNS record for the domain name associated with the on-chain asset.

In one embodiment, when a request for a domain name is received, the request is sent to a registry to identify the owner/nameserver that owns the domain name. Where the owner/nameserver stores the domain names in a domain registrar blockchain 106 and the DNS records in a DNS resolver blockchain 112, the owner/nameserver is configured to read the appropriate blockchain and return whatever data is stored in the blockchain.

In one embodiment, the domain registrar blockchain 106, or blockchain-based domain registrar, is a blockchain database, or distributed ledger, storing domain name registration data. The domain registrar blockchain 106 can use nameserver smart contracts 108 to build a registrar to store domain names. In embodiments, the nameserver smart contracts 108 can include one or more smart contracts. Smart contracts are state based logical units that operate on-chain. They are programmable agreements that can be used to build decentralized protocols on the domain registrar blockchain 106. In some embodiments, the nameserver smart contracts 108 are used to mint and register new domain names on-chain in the domain registrar blockchain 106. For the domain registrar blockchain 106, the nameserver smart contracts 108 store which domain names are stored on-chain.

In one embodiment, the DNS resolver blockchain 112 is a blockchain database, or distributed ledger, storing DNS records. The DNS resolver blockchain 112 can use blockchain resolver smart contracts 114 to build a registrar to store and manage DNS records for corresponding domain names. In embodiments, the resolver smart contracts 114 can include one or more smart contracts. Smart contracts are programmable agreements that can be used to build decentralized protocols on the DNS resolver blockchain 112. In some embodiments, the blockchain resolver smart contracts 114 are used to store and resolve DNS records associated with a specific domain name. For the DNS resolver blockchain 112, the blockchain resolver smart contracts 114 store the different DNS records for each domain name.

Figure 2:
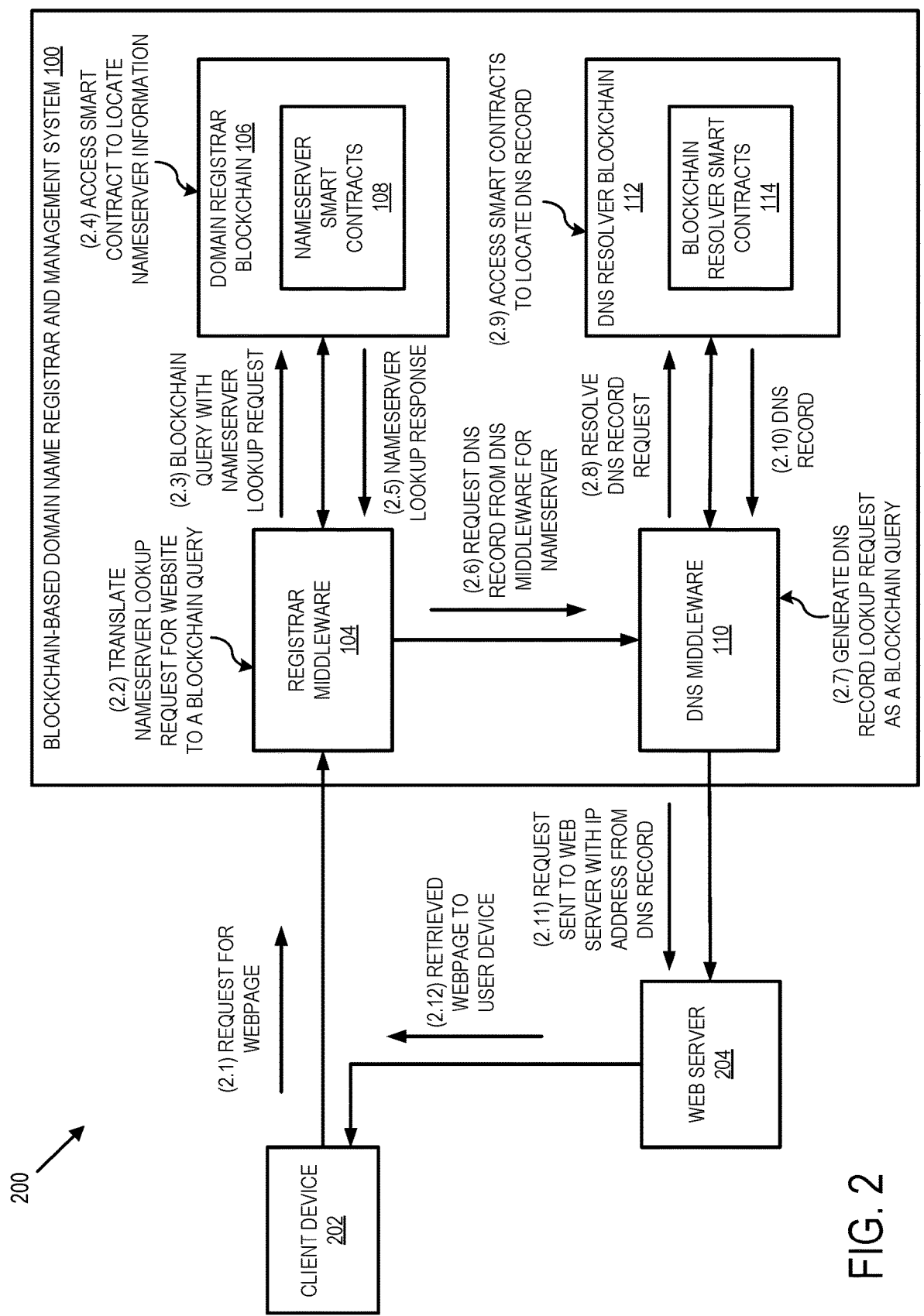
FIG. 2 illustrates an exemplary networked system for resolving a domain name using a blockchain-based domain registrar according to some embodiments described herein.

FIG. 2 illustrates an exemplary networked system for resolving a domain name using a blockchain-based domain registrar according to some embodiments described herein. The exemplary networked system 200 illustrated in FIG. 2 includes blockchain-based domain name registrar and management system 100, a client device 202, and a web server 204. The blockchain-based domain name registrar and management system 100 includes registrar middleware 104, a domain registrar blockchain 106, DNS middleware 110, and a DNS resolver blockchain 112.

Examples of client device 202 include computing devices (e.g., laptops, workstations, smartphones, palm tops, mobile phones, tablets, gaming systems, set top boxes, wearable devices, electronic devices, etc.) that are capable of transmitting and/or receiving network traffic. In some embodiments, client device 202 executes a client network application that is capable of transmitting and/or receiving network traffic. For example, client network applications may be a web browser or other application that can access network resources (e.g., web pages).

In one embodiment, the web server 204 is a device that receives request (e.g., HTTP/S requests) for resources, such as a webpage. For example, the web server 204 can receive a request for a resource (e.g., a webpage) that includes an address (e.g., IP address) for the resource and either return the requested resource or an error message.

In one embodiment, a request for a webpage is received at the registrar middleware 104 from a client device 202, at operation 2.1. The request for the webpage can be generated in response to a user selecting a link or URL for the webpage (e.g., in a browser application or client network application). For example, the request can be for the webpage "http://page.example.com." In embodiments, to determine the nameserver that owns or manages the requested webpage, a forward lookup process is performed by first sending the request to a local DNS server. If the address of the nameserver for the webpage is not stored in a cache of the local DNS server, the local DNS server performs a recursive query, or recursive lookup, to other DNS servers determine the identity (e.g., IP address) of the nameserver for the webpage. For example, where the request is for "page.example.com," the local DNS server may first forward the request to a DNS root server, which returns the address for the ".com" top level DNS server. The local DNS server than forwards the request to the ".com" top level DNS server, which returns the address for the "example.com" nameserver, where the "example.com" nameserver stores DNS records on-chain. The local DNS server than forwards the request to the "example.com" nameserver, on which the registrar middleware 104 is executing.

In one embodiment, the registrar middleware 104 translates the request for the webpage to a blockchain query, at operation 2.2. For example, the registrar middleware 104 translates the request for the webpage to a blockchain query by decoding the DNS request and performing a recursive query on the associated DNS records. The blockchain query is then sent to the domain registrar blockchain 106 to perform the nameserver lookup request is, at operation 2.3. Common DNS requests can include a QName (or target zone) and a QType (or requested record type). Each recursive query performs a series of record lookups by asking the smart contract for the records for X QName and X QType.

In one embodiment, the nameserver smart contracts 108 are accessed to locate nameserver information, at operation 2.4. In one embodiments, when the blockchain query generated by the registrar middleware 104 hits the domain registrar blockchain 106, the domain registrar blockchain 106 checks the nameserver smart contracts 108 to determine whether the requested domain name is stored on the domain registrar blockchain 106. In one embodiment, the blockchain query is sent to a public remote procedure code (RPC) node, in which the node carries out the RPC request and returns the corresponding data. In other embodiments, an RPC node is run locally and in sync with the blockchain network. The blockchain query is then sent to the local RPC node, which carries out the RPC request and returns the data. In both cases, the blockchain queries are queries (e.g., non-transactional, interactions with the node and network), where they only read data from the blockchain. As they are used to lookup DNS records, they do not modify the state.

In one embodiment, the registrar middleware 104 performs a series of recursive queries to determine the zone associated with the DNS request. Because all zones are treated as their own registration, the registrar middleware 104 performs a recursive query from left to right to determine the parent zone that the request corresponds to. For example, a request for "a.b.example.com" could have three possible zones (e.g., "a.b.example.com," "b.example.com," and "example.com"). However, each zone may be owned by a different user/entity. For example, a first user/entity owns "example.com" and mints a subdomain, "b.example.com" as an on-chain asset (e.g., tokens or NFTs) to a second user/entity's digital wallet. The registration link between the domain and the zone is stored in the domain registrar blockchain 106. In such situations, the DNS record for "b.example.com" can be set in the context of the first user's zone in the resolver blockchain, but the second user's zone records take precedence. The first user's DNS records overlapping with the second user's zone may only be referenced if the second user's zone is burned. Thus, if a blockchain query is received for "a.b.example.com," the second user's zone (e.g., "x.example.com") is referenced instead of the first user's zone (e.g., "example.com").

Once the registrar middleware 104 identifies the parent zone from the domain registrar blockchain 106, that zone (or node) is then used to query the corresponding DNS records.

When the requested domain name is determined to be stored on the domain registrar blockchain 106, a nameserver lookup response is returned to the registrar middleware 104, at operation 2.5. The nameserver lookup response can include the nameserver (e.g., an address for the nameserver) for the requested domain name. For example, the nameserver for "example.com" is provided. The nameserver for the requested domain name is then sent to the DNS middleware 110, at operation 2.6.

In one embodiment, the DNS middleware 110 then generates a DNS record lookup request as a blockchain query using the nameserver for the requested domain name, at operation 2.7. The DNS middleware 110 then resolves the DNS record request by sending the blockchain query to the DNS resolver blockchain, at operation 2.8. In embodiments, the blockchain query is specific to the configuration of the blockchain resolver smart contracts 114 and the schema of the data stored in the blockchain resolver smart contracts 114. In one embodiment, the blockchain resolver smart contracts 114 include a function, "DNSRecord," that takes in a root zone, a qname (or query name), and a resource (e.g., indicating the requested DNS record type). Using the "http://page.example.com" example, the root zone is "example.com," the qname is "page.example.com," and the resource is an "A record").

In one embodiment, the blockchain resolver smart contracts 114 are accessed to locate the DNS record for the requested webpage, at operation 2.9. If the requested domain name is stored on the DNS resolver blockchain 112, a DNS record lookup is performed to determine if the requested domain name delegates control elsewhere. For example, a delegate DNS record type (e.g., a DS record) can be used to point authoritative control to a different IP address or canonical name (CNAME). If the requested domain name does delegate control, the request is forwarded. If the requested domain name does not delegate control, DNS resolver blockchain 112 checks to see if the corresponding record exists. If the record exists, the data is returned, including the nameserver(s) upon which to locate the DNS records. If the record does not exist, a "no data" response is returned. If the requested domain name is not stored on the DNS resolver blockchain 112, the DNS request is denied. For example, continuing the example, the root server for "http://page.example.com" can be queried, and the server that controls ".com" is returned. The ".com" server is then queried for "example.com", and the server that controls "example.com" is returned. The "example.com" server is then queried for "page.example.com," and the "page.example.com" record can be returned. In some embodiments, if the "example.com" server has delegated control of the subdomain to another server, the querying process continues until the server that has the record is identified.

In some embodiments, the data in the blockchain resolver smart contracts 114 is tracked and then stored in an off-chain database. In such embodiments, a bot can be used to monitor new transactions and mirror any modifications made to DNS records on-chain, in the off-chain database. To perform a lookup where the data is stored in an off-chain database, the off-chain database can be simply queried.

In one embodiment, after locating the DNS record, the DNS record or an IP address determined from the DNS record, is returned, at operation 2.10. In one embodiment, after receiving the DNS record, the DNS middleware 110 directs the request for the webpage to a web server using the IP address indicated by the DNS record, at operation 2.11. In other embodiments, the DNS middleware 110 returns the IP address indicated by the DNS record to the client device 202 directly, and the client device 202 sends the request for the webpage using the IP address to the web server 204.

In one embodiment, the retrieved webpage is transmitted to the client device 202, at operation 2.12.

Figure 3:
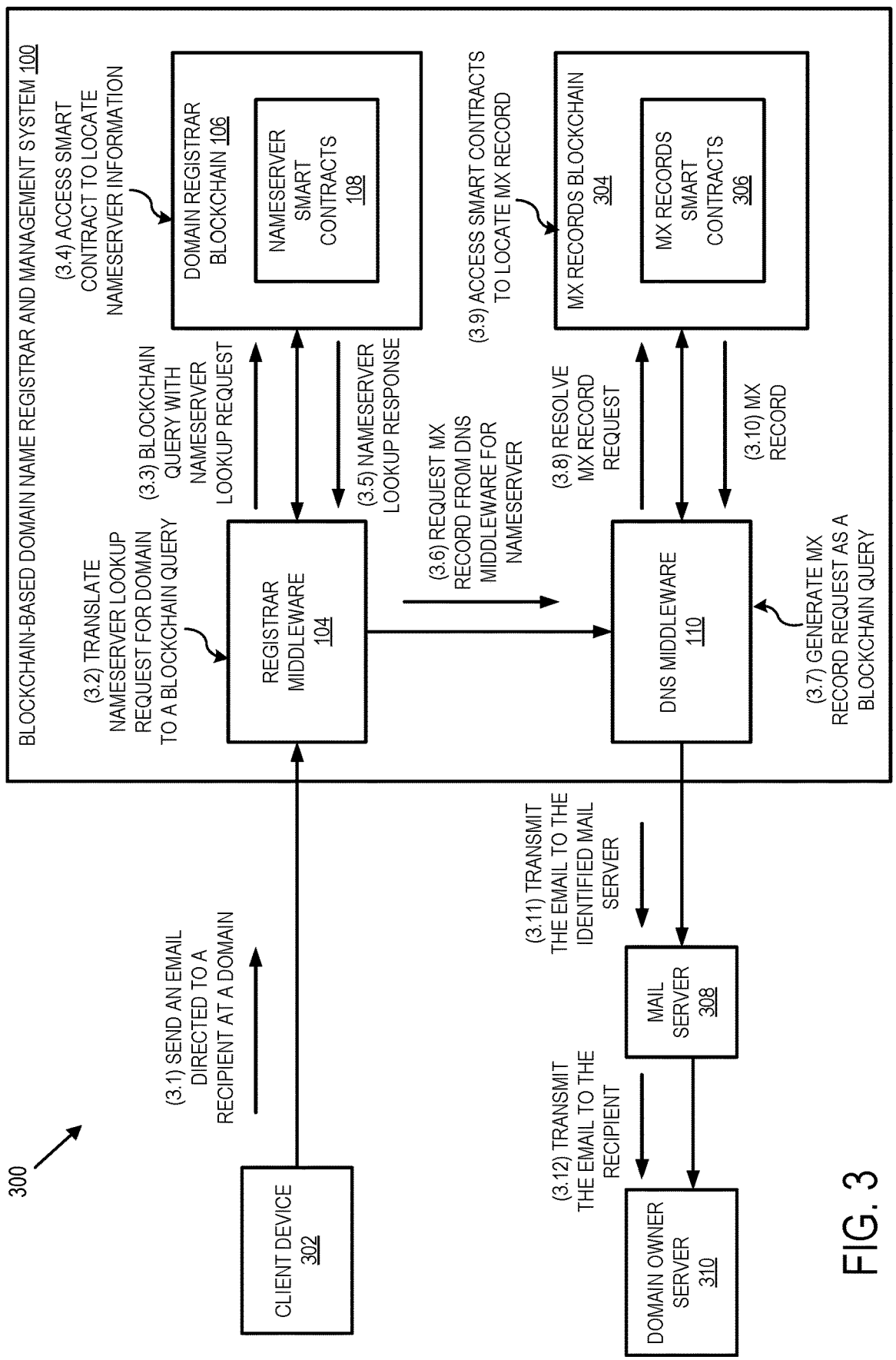
FIG. 3 illustrates an exemplary networked system for transmitting an email message using a blockchain-based domain registrar according to some embodiments described herein.

FIG. 3 illustrates an exemplary networked system for transmitting an email message using a blockchain-based domain registrar according to some embodiments described herein. The exemplary networked system 300 illustrated in FIG. 3 includes blockchain-based domain name registrar and management system 100, a client device 302, a mail server 308 and a domain owner server 310. The blockchain-based domain name registrar and management system 100 includes registrar middleware 104, a domain registrar blockchain 106, DNS middleware 110, and an MX records blockchain 304.

In one embodiment, the MX records blockchain 304 is a blockchain database, or distributed ledger, storing mail exchanger (MX) records. An MX record is a record indicating how an email message should be routed to arrive at a mail server. The MX records blockchain 304 can use MX records smart contracts 306 to build a registrar to store and managed MX records for corresponding domain names. Smart contracts are programmable agreements that can be used to build decentralized protocols on the MX records blockchain 304. In some embodiments, the MX records smart contracts 306 are used to store and resolve MX records associated with a specific domain name. For the MX records blockchain 304, the MX records smart contracts 306 store the different MX records for each domain name.

In one embodiment, the mail server 308 is a device configured to receive and send email messages between computing devices. For example, the mail server 308 can receive an email from a sending computing device (e.g., client device 302) to a recipient computing device (e.g., via a domain owner server 310).

In one embodiment, a client device 302 sends an email message directed to a recipient at a domain that is received at the registrar middleware 104, at operation 3.1. For example, the email message can be directed to the email address: "mail@example.com," where "example.com" is the domain of the recipient. In embodiments, the email message can be sent using a client application (e.g., an email application). In embodiments, to determine the nameserver that owns or manages the requested email domain, a forward lookup process is performed, as described with respect to FIG. 2.

In one embodiment, the registrar middleware 104 translates a nameserver lookup request for the domain to a blockchain query, at operation 3.2. In some embodiments, the registrar middleware 104 translates the request for the webpage to a blockchain query, as described with respect to FIG. 2. The blockchain query to perform the nameserver lookup request is then sent to the domain registrar blockchain 106, at operation 3.3.

In one embodiment, the nameserver smart contracts 108 are accessed to locate nameserver information, at operation 3.4. In one embodiments, when the blockchain query generated by the registrar middleware 104 hits the domain registrar blockchain 106, the domain registrar blockchain 106 checks the nameserver smart contracts 108 to determine whether the requested domain name (e.g., "example.com") is stored on the domain registrar blockchain 106.

When the requested domain name is determined to be stored on the domain registrar blockchain 106, a nameserver lookup response is returned to the registrar middleware 104, at operation 3.5. The nameserver lookup response can include the nameserver (e.g., an address for the nameserver) for the requested domain name. For example, the nameserver for "example.com" is provided. The nameserver for the requested domain name is then sent to the DNS middleware 110, at operation 3.6.

In one embodiment, the DNS middleware 110 then generates an MX record lookup request as a blockchain query using the nameserver for the requested domain name, at operation 3.7. The DNS middleware 110 then resolves the MX record request by sending the blockchain query to the MX records blockchain 304, at operation 3.8.

In one embodiment, the MX records smart contracts 306 are accessed to locate the MX record for the requested domain, at operation 3.9. If the requested domain name is stored on the MX records blockchain 304, a MX record lookup is performed to determine if the requested domain name delegates control elsewhere. If the requested domain name does delegate control, the request is forwarded. If the requested domain name does not delegate control, MX records blockchain 304 checks to see if the corresponding record exists. If the record exists, the data is returned, including the nameserver(s) upon which to locate the MX records. If the record does not exist, a "no data" response is returned. If the requested domain name is not stored on the MX records blockchain 304, the MX request is denied.

In one embodiment, after locating the MX record, the MX record or an IP address determined from the MX record, is returned, at operation 3.10. In one embodiment, after receiving the MX record, the DNS middleware 110 directs the email message to a mail server 308 using the IP address indicated by the MX record, at operation 3.11. In one embodiment, the mail server 308 then transmits the email message to the domain owner server 310 for delivery to a recipient client device, at operation 3.12.

Figure 4:
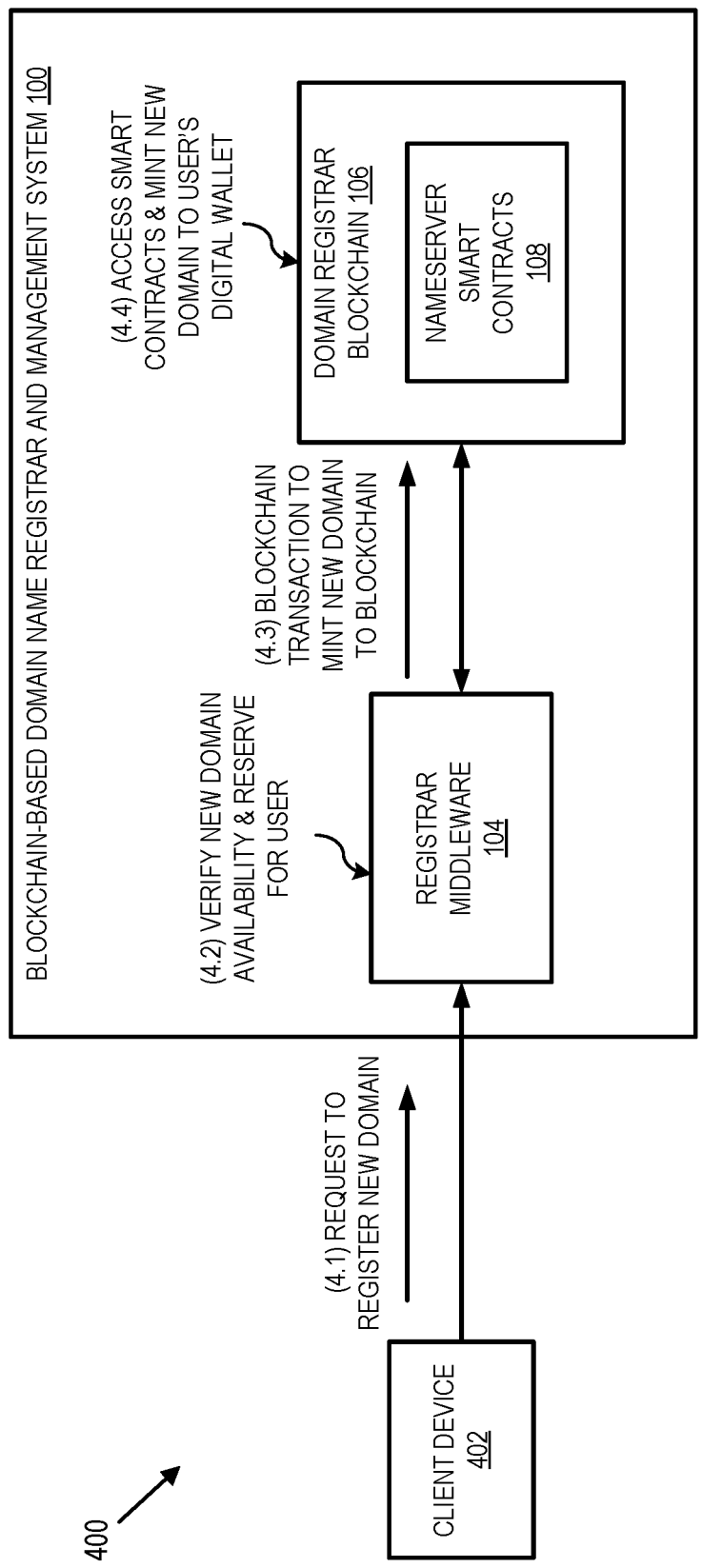
FIG. 4 illustrates an exemplary networked system for performing a registration process for a new domain name using a blockchain-based domain registrar according to some embodiments described herein.

FIG. 4 illustrates an exemplary networked system for performing a registration process for a new domain name using a blockchain-based domain registrar according to some embodiments described herein. The exemplary networked system 400 illustrated in FIG. 4 includes blockchain-based domain name registrar and management system 100 and a client device 402. The blockchain-based domain name registrar and management system 100 includes registrar middleware 104 and a domain registrar blockchain 106.

In one embodiment, the client device 402 sends a registration request to register a new domain for a user, at operation 4.1. For example, the client device 402 can send a registration request to register "newexample.com." The registration request is received by the registrar middleware 104. In embodiments, to determine the nameserver that owns or manages the new domain, a forward lookup process is performed, as described with respect to FIG. 2.

In one embodiment, the registrar middleware 104 verifies the availability of the new domain and reserves the new domain for the user, at operation 4.2. In some embodiments, the registrar middleware 104 first verifies that the new domain name is unique and perform an off-chain registration prior to issuing the domain name on-chain. For example, the registrar middleware 104 performs a verification process with the Internet Corporation for Assigned Names and Numbers (ICANN) for the new domain name. This can include providing identifying contact information for the registrant, among others.

In some embodiments, instead of performing an off-chain registration, all domains can be stored on the domain registrar blockchain 106, as a top-level domain. In such embodiments, the registrar middleware 104 does not interface with any other off-chain systems to verify if a new domain name is available, as the registrar middleware 104 can just check the domain registrar blockchain 106.

In one embodiment, after the registrar middleware 104 reserves the new domain, the registrar middleware 104 sends a blockchain transaction to mint the new domain name to the domain registrar blockchain 106, at operation 4.3. The blockchain transaction may include an authorization signature which is used by the registrar smart contract to authorize the mint. Funds may be collected on-chain or off-chain. The nameserver smart contracts 108 are accessed and the new domain name is minted as a new on-chain asset to the user's digital wallet, at operation 4.4. For example, the on-chain asset is assigned to the address of the user's digital wallet. In some embodiments, this includes storing a mapping in a specific smart contract that maps the new domain name to the user's wallet address. The mapping stores all domain names that are registered on the domain registrar blockchain 106 and their owners. This allows for lookups for registered domains, and if registered, to whom they are registered.

In some embodiments, a notification message can be transmitted back to the client device 402 confirming the registration of the new domain name. In some embodiments, the newly registered domain can be returned to the client device 402 as an NFT.

Figure 5:
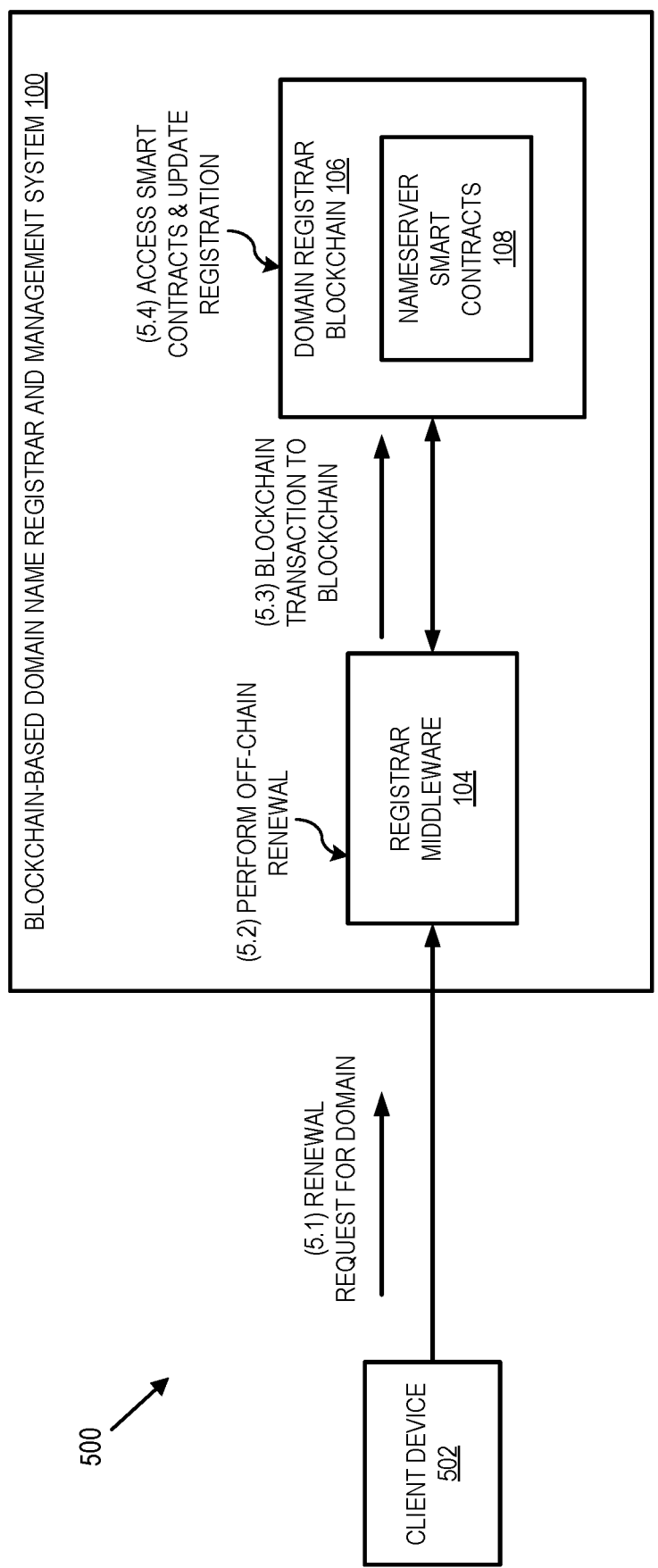
FIG. 5 illustrates an exemplary networked system for performing an off-chain renewal process for a domain name using a blockchain-based domain registrar according to some embodiments described herein.

FIG. 5 illustrates an exemplary networked system for performing an off-chain renewal process for a domain name using a blockchain-based domain registrar according to some embodiments described herein. The exemplary networked system 500 illustrated in FIG. 5 includes blockchain-based domain name registrar and management system 100 and a client device 502. The blockchain-based domain name registrar and management system 100 includes registrar middleware 104 and a domain registrar blockchain 106.

In one embodiment, the client device 502 sends a renewal request for a domain, at operation 5.1. For example, the client device 502 can send a renewal request to be performed off-chain for the renewal of the domain "example.com." The renewal request is received by the registrar middleware 104. In embodiments, to determine the nameserver that owns or manages the domain, a forward lookup process is performed, as described with respect to FIG. 2.

In one embodiment, the registrar middleware 104 updates the ICANN registration for the domain name off-chain, at operation 5.2. In one embodiment, after the registrar middleware 104 updates the ICANN registration for the domain name to reflect the renewal, the registrar middleware 104 sends a blockchain transaction to update the domain expiration date to the domain registrar blockchain 106, at operation 5.3. The nameserver smart contracts 108 are accessed and the registration expiration date for the domain name is updated to the user's wallet address, at operation 5.4. For example, an expiration metadata variable associated with the existing on-chain asset in the domain registrar blockchain 106 is updated.

In some embodiments, a notification message can be transmitted back to the client device 502 confirming the renewal of the domain name, including the updated expiration date of the user's registration of the domain name.

Figure 6:
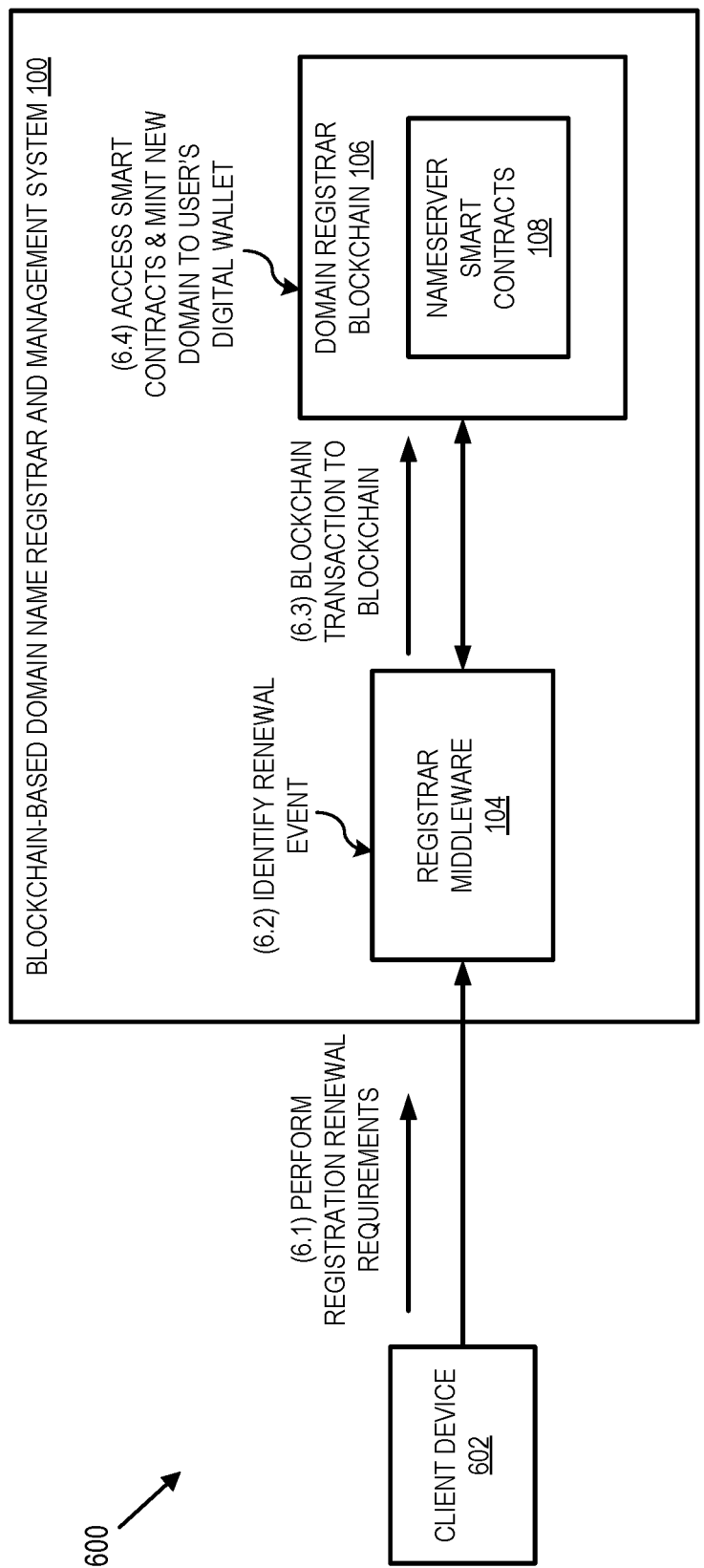
FIG. 6 illustrates an exemplary networked system for performing an on-chain renewal process for a domain name using a blockchain-based domain registrar according to some embodiments described herein.

FIG. 6 illustrates an exemplary networked system for performing an on-chain renewal process for a domain name using a blockchain-based domain registrar according to some embodiments described herein. The exemplary networked system 600 illustrated in FIG. 6 includes blockchain-based domain name registrar and management system 100 and a client device 602. The blockchain-based domain name registrar and management system 100 includes registrar middleware 104 and a domain registrar blockchain 106.

In one embodiment, the client device 602 performs the registration renewal requirements (e.g., pays registrar to extend the domain), at operation 6.1. For example, the client device 602 performs the renewal to extend the registration of the domain "example.com." In embodiments, to determine the nameserver that owns or manages the domain, a forward lookup process is performed, as described with respect to FIG. 2.

In one embodiment, the registrar middleware 104 identifies a renewal event, at operation 6.2. In one embodiment, the registrar middleware 104 emits the renewal event. The emitting of the renewal event indicates that a renewal transaction has been successfully executed on the domain registrar blockchain 106. This allows the renewal event to be a transparent and auditable event. Further, the emitting of the renewal event indicates that the renewal should be replicated in off-chain. In one embodiment, after the registrar middleware 104 identifies the renewal event, the registrar middleware 104 sends a blockchain transaction to update the domain expiration date to the domain registrar blockchain 106, at operation 6.3. The nameserver smart contracts 108 are accessed and the registration expiration date for the domain name is updated to the user's digital wallet, at operation 6.4. For example, the expiration date for the on-chain asset is updated.

In some embodiments, a notification message can be transmitted back to the client device 602 confirming the renewal of the domain name, including the updated expiration date of the user's registration of the domain name.

Figure 7:
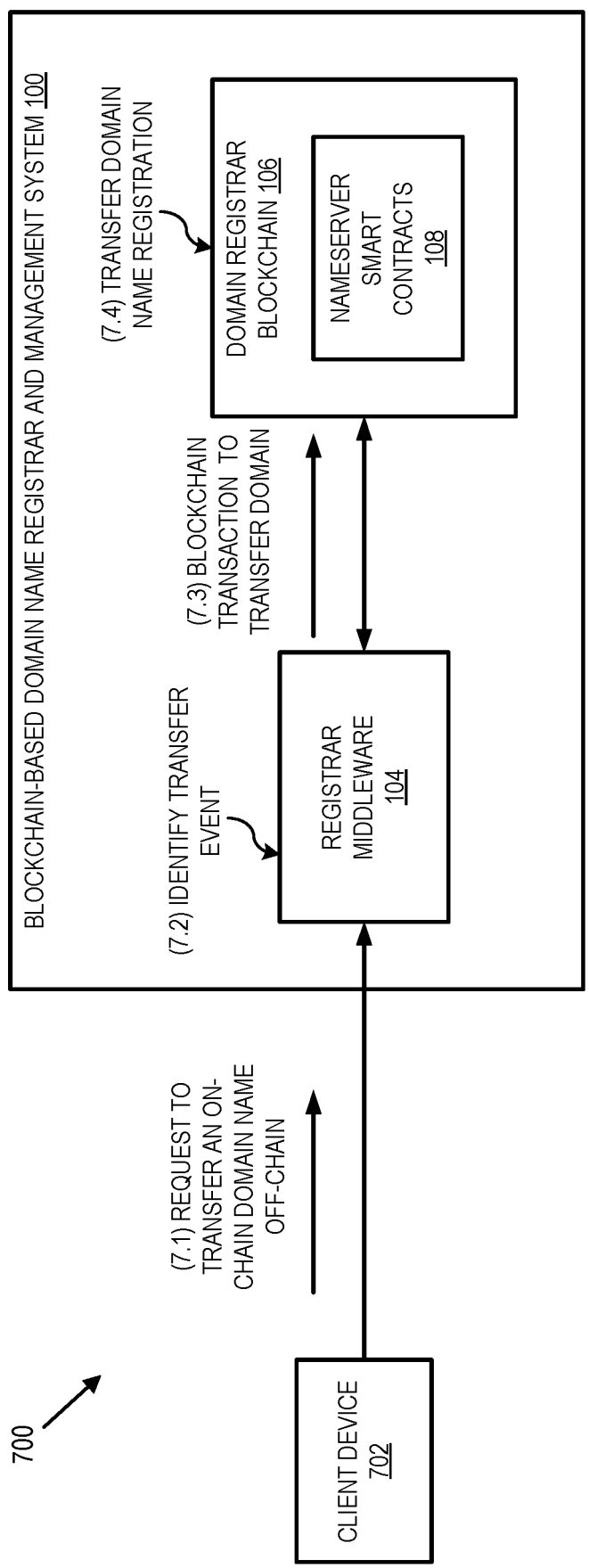
FIG. 7 illustrates an exemplary networked system for performing a process of transferring a domain name from a blockchain-based domain registrar to a non-blockchain registrar according to some embodiments described herein.

FIG. 7 illustrates an exemplary networked system for performing a process of transferring a domain name from a blockchain-based domain registrar to a non-blockchain registrar according to some embodiments described herein. The exemplary networked system 700 illustrated in FIG. 7 includes blockchain-based domain name registrar and management system 100 and a client device 702. The blockchain-based domain name registrar and management system 100 includes registrar middleware 104 and a domain registrar blockchain 106.

In one embodiment, the client device 702 requests to transfer a domain name on the domain registrar blockchain 106 to a new non-blockchain-based registrar (e.g., a traditional registrar database), at operation 7.1. For example, the client device 702 can send a request to burn the on-chain token in the user's wallet for the on-chain domain name at the domain registrar blockchain 106. The request can further include information regarding the new non-blockchain-based registrar. The registration request is received by the registrar middleware 104. In embodiments, to determine the nameserver that owns or manages the domain, a forward lookup process is performed, as described with respect to FIG. 2.

In one embodiment, the registrar middleware 104 identifies the transfer event, at operation 7.2. In one embodiment, the registrar middleware 104 emits the transfer event. The emitting of the transfer event indicates that a transfer transaction has been successfully executed to transfer the domain name from the domain registrar blockchain to a non-blockchain registrar. This allows the transfer event to be a transparent and auditable event. Further, the emitting of the transfer event indicates that the transfer should be replicated in off-chain. In one embodiment, the registrar middleware 104 sends a blockchain transaction to transfer the domain from the domain registrar blockchain 106 to the new non-blockchain-based registrar, at operation 7.3. The domain registrar blockchain 106 updates the ICANN registration for the domain name to reflect the transfer of the domain name from the domain registrar blockchain 106 to the new non-blockchain-based registrar, at operation 7.4.

In some embodiments, a notification message can be transmitted back to the client device 702 confirming the transfer of the domain from the domain registrar blockchain 106 to the new non-blockchain-based registrar.

Figure 8:
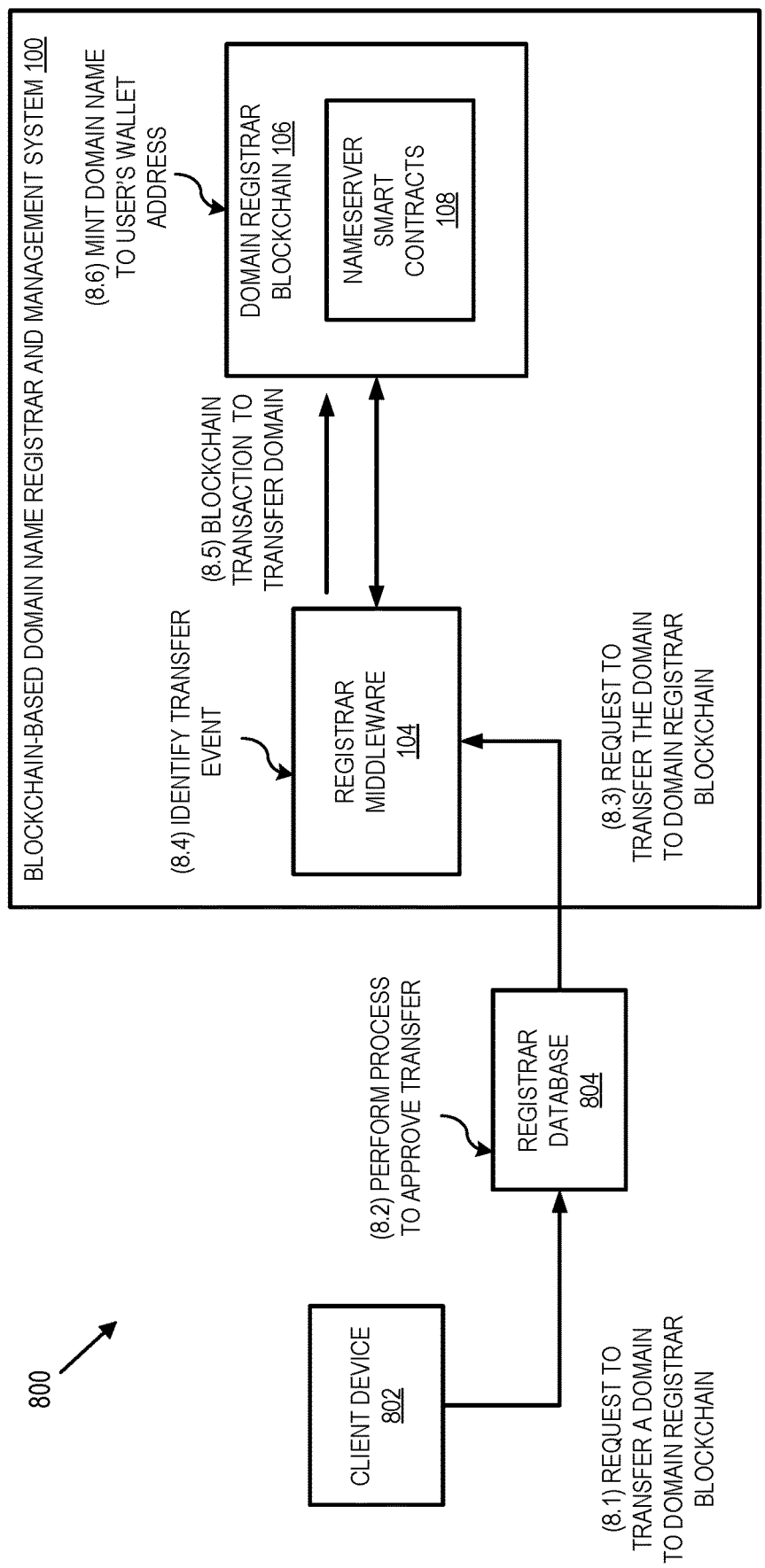
FIG. 8 illustrates an exemplary networked system for performing a process of transferring a domain name from a non-blockchain registrar to a blockchain-based domain registrar according to some embodiments described herein.

FIG. 8 illustrates an exemplary networked system for performing a process of transferring a domain name from a non-blockchain registrar to a blockchain-based domain registrar according to some embodiments described herein. The exemplary networked system 800 illustrated in FIG. 8 includes blockchain-based domain name registrar and management system 100, a client device 802, and a registrar database 804. The registrar database 804 can be a database storing domain names for a domain name registrar. The blockchain-based domain name registrar and management system 100 includes registrar middleware 104 and a domain registrar blockchain 106.

In one embodiment, the client device 802 requests to transfer a domain name on a non-blockchain-based registrar (e.g., registrar database 804) to a domain registrar blockchain (e.g., domain registrar blockchain 106), at operation 8.1. In such embodiments, the client device 802 can further provide a wallet address to the registrar database 804 for transferring the domain name to the domain registrar blockchain 106

In one embodiment, the registrar database performs a process to approve the transfer, at operation 8.2. In one embodiment, the registrar database 804 sends a request to transfer the domain to the domain registrar blockchain 106, at operation 8.3. In embodiments, to determine the nameserver that owns or manages the domain, a forward lookup process is performed, as described with respect to FIG. 2. The registration request is received by the registrar middleware 104 and the transfer event is identified, at operation 8.4. The emitting of the transfer event indicates that a transfer transaction has been successfully executed to transfer the domain name from the domain registrar blockchain to a non-blockchain registrar. This allows the transfer event to be a transparent and auditable event. Further, the emitting of the transfer event indicates that the transfer should be replicated in off-chain. In one embodiment, the registrar middleware 104 sends a blockchain transaction to transfer the domain to the domain registrar blockchain 106, at operation 8.5. The domain registrar blockchain 106 mints the domain name to the wallet address received from the client device 802, at operation 8.6.

In some embodiments, a notification message can be transmitted back to the client device 802 confirming the transfer of the domain from to the domain registrar blockchain 106.

Figure 9:
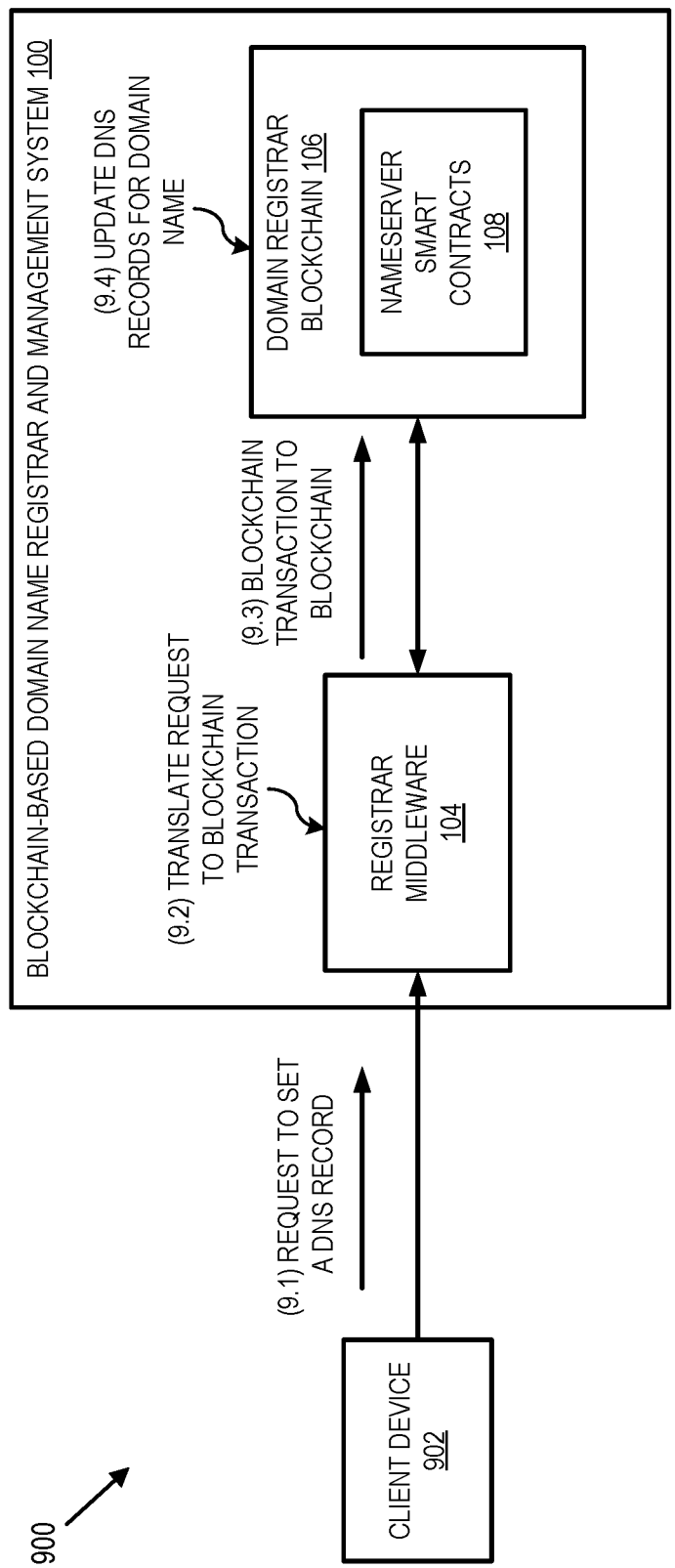
FIG. 9 illustrates an exemplary networked system for setting a DNS record for a domain name with a blockchain-based domain registrar according to some embodiments described herein.

FIG. 9 illustrates an exemplary networked system for setting a DNS record for a domain name with a blockchain-based domain registrar according to some embodiments described herein. The exemplary networked system 900 illustrated in FIG. 9 includes blockchain-based domain name registrar and management system 100 and a client device 902. The blockchain-based domain name registrar and management system 100 includes registrar middleware 104 and a domain registrar blockchain 106.

In one embodiment, the client device 902 sends a request to set a DNS record associated with a domain name stored on the domain registrar blockchain 106, at operation 9.1. The request can include, at least, information identifying the domain name and an address for the DNS record (e.g., a new or updated IP address). In some embodiments, the request can be to change or update a DNS record. In embodiments, to determine the nameserver that owns or manages the domain, a forward lookup process is performed, as described with respect to FIG. 2. The request is received by the registrar middleware 104 and the request is translated to a blockchain transaction, at operation 9.2. In one embodiment, the registrar middleware 104 sends the blockchain transaction to set the DNS record for the domain to the domain registrar blockchain 106, at operation 9.3. The domain registrar blockchain 106 updates the DNS records for the domain name, at operation 9.4.

Figure 10:
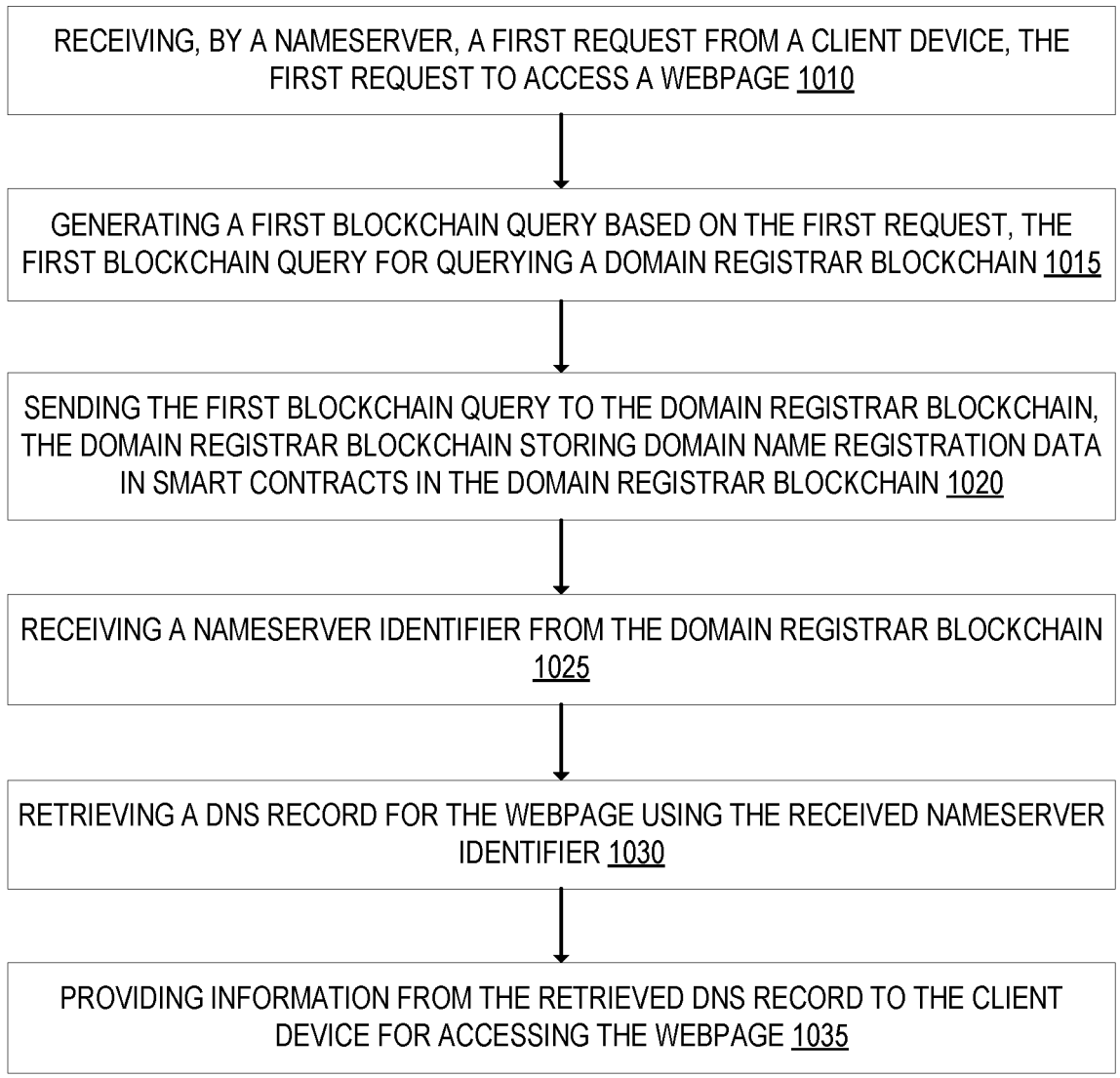
FIG. 10 is a flow diagram that illustrates exemplary operations for a blockchain-based domain name registrar according to an embodiment.

FIG. 10 is a flow diagram that illustrates exemplary operations for a blockchain-based domain name registrar according to an embodiment. The operations of FIG. 10 will be described with reference to the exemplary embodiment of the other figures. However, it should be understood that the operations of FIG. 10 can be performed by embodiments of the invention other than those discussed with reference to the other figures, and the embodiments discussed with reference to the other figures can perform operations different than those discussed with reference to FIG. 10. The operations of FIG. 10 are described as being performed by the nameserver 102 of a blockchain-based domain name registrar and management system 100.

At operation 1010, a nameserver receives a first request from a client device, the first request to access a webpage. In some embodiments, the request for the webpage can be generated in response to a user selecting a link or URL for the webpage (e.g., in a browser application or client network application)." In embodiments, to determine the nameserver that owns or manages the requested webpage, a recursive forward lookup process is performed to identify the nameserver that is the authoritative name server for the requested webpage.

At operation 1015, the nameserver generates a first blockchain query based on the first request, the first blockchain query for querying a domain registrar blockchain. In one embodiment, the nameserver includes middleware services (e.g., register middleware) that is configured to translate request messages from a first request type to a second request type. For example, the register middleware can translate a nameserver lookup request structured for identifying nameserver (NS) records from a centralized database into the first blockchain query structured for querying data in a blockchain.

At operation 1020, the nameserver sends the first blockchain query to the domain registrar blockchain, the domain registrar blockchain storing domain name registration data in smart contracts in the domain registrar blockchain.

At operation 1025, the nameserver receives a nameserver identifier from the domain registrar blockchain. In some embodiments, when the blockchain query generated by the registrar middleware hits the domain registrar blockchain, the domain registrar blockchain checks the nameserver smart contracts to determine whether the requested domain name is stored on the domain registrar blockchain. When the requested domain name is determined to be stored on the domain registrar blockchain, a nameserver lookup response is returned to the registrar middleware. The nameserver lookup response can include a nameserver identifier (e.g., an address for the nameserver) for the requested domain name. For example, the nameserver for "example.com" is provided. The nameserver for the requested domain name is then sent to the DNS middleware 110.

At operation 1030, the nameserver retrieves a DNS record for the webpage using the received nameserver identifier. After receiving the nameserver identifier from the domain registrar blockchain, the nameserver identifier for the requested domain name can then be sent to middleware (e.g., DNS middleware). In some embodiments, the registrar middleware and the DNS middleware can be a single component of the nameserver. In one embodiment, the DNS middleware generates a DNS record lookup request as a second blockchain query using the nameserver identifier for the requested domain name. In some embodiments, a DNS resolver blockchain storing DNS records in smart contracts is designated by the domain registrar blockchain. For example, the blockchain-based domain name registrar can set the DNS resolver blockchain as a default smart contract controlled by the blockchain-based domain name registrar. In embodiments, when the blockchain-based domain name registrar updates the smart contract for subsequent registrations, users with existing registrations can either migrate to the new smart contract or keep the existing registration. In one embodiment, migration to the new smart contract includes changing the address of the resolver smart contract corresponding to a zone in the registrar smart contract. In some embodiments, migration can further include setting the same DNS records in the new resolver smart contract. The DNS middleware then resolves the DNS record request by sending the second blockchain query to the DNS resolver blockchain. In one embodiment, blockchain resolver smart contracts are accessed to locate the DNS record for the requested webpage. If the record exists, the DNS record is returned back to the nameserver.

At operation 1035, the nameserver provides information from the retrieved DNS record to the client device for accessing the webpage. For example, the nameserver can extract or retrieve an IP address for the requested webpage from the retrieved DNS records. In some embodiments, the nameserver can contact the web server hosting the webpage using the IP address and retrieve the requested webpage on behalf of the client device.

Figure 11:
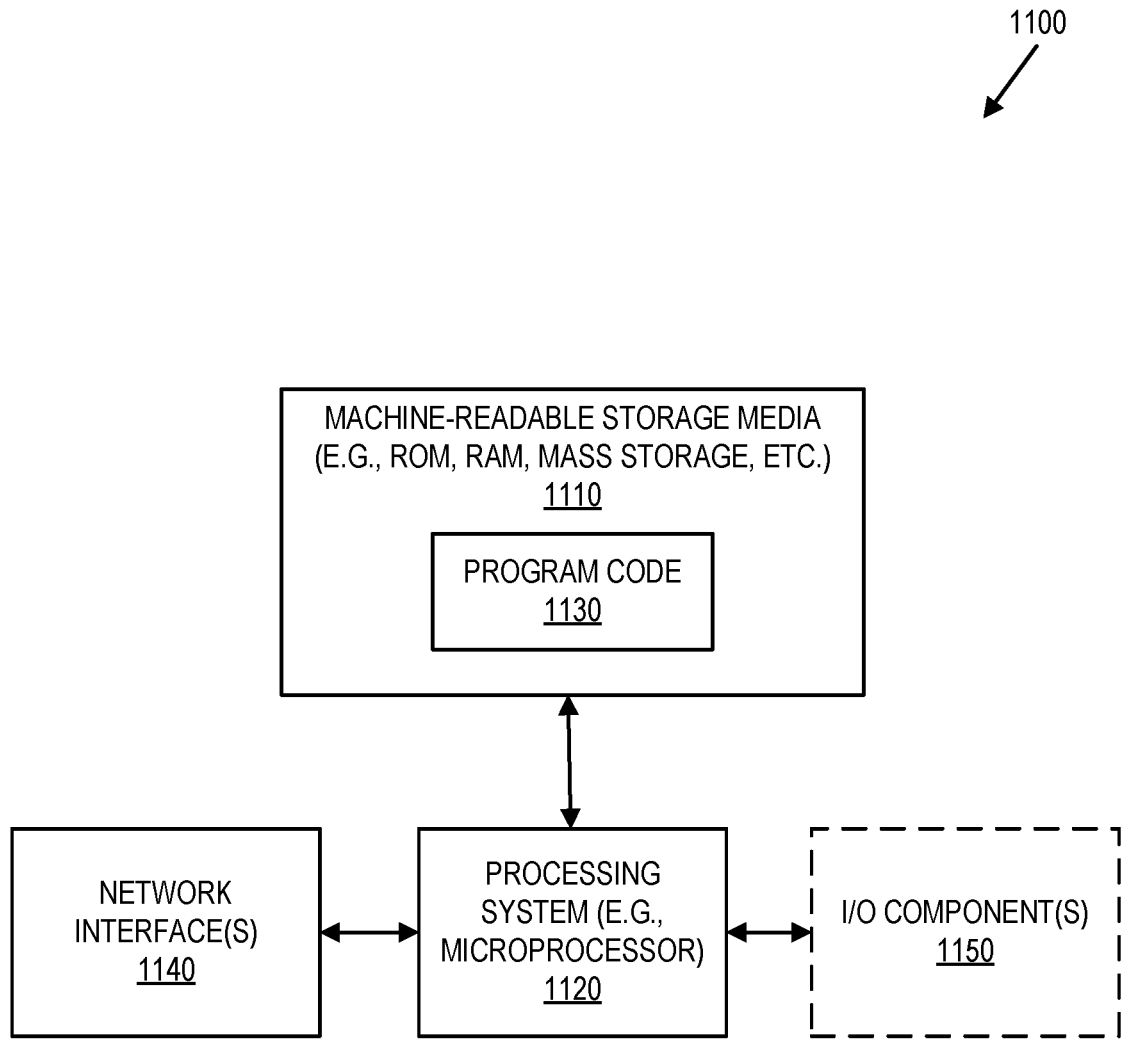
FIG. 11 is a block diagram for an exemplary data processing system that can be used in some embodiments.

FIG. 11 illustrates a block diagram for an exemplary data processing system 1100 that may be used in some embodiments. One or more such data processing systems 1100 may be utilized to implement the embodiments and operations described with respect to the nameserver 102, the domain registrar blockchain 106, and the DNS resolver blockchain 112, or other computing devices. The data processing system 1100 is a computing device that stores and transmits (internally and/or with other computing devices over a network) code (which is composed of software instructions and which is sometimes referred to as computer program code or a computer program) and/or data using machine-readable media (also called computer-readable media), such as machine-readable storage media 1110 (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals), which is coupled to the processing system 1120 (e.g., one or more processors and connected system components such as multiple connected chips). For example, the depicted machine-readable storage media 1110 may store program code 1130 that, when executed by the processing system 1120, causes the data processing system 1100 to perform any of the operations described herein.

The data processing system 1100 also includes one or more network interfaces 1140 (e.g., a wired and/or wireless interfaces) that allows the data processing system 1100 to transmit data and receive data from other computing devices, typically across one or more networks (e.g., Local Area Networks (LANs), the Internet, etc.).

The data processing system 1100 also includes one or more input or output ("I/O") components 1150, which are provided to allow a user to provide input to, receive output from, and otherwise transfer data to and from the system. These I/O components 1150 may include a mouse, keypad, keyboard, a touch panel or a multi-touch input panel, camera, frame grabber, optical scanner, an audio input/output subsystem (which may include a microphone and/or a speaker), other known I/O devices or a combination of such I/O devices. The one or more I/O components 1150 may include wireless transceivers, such as an IEEE 802.11 transceiver, an infrared transceiver, a Bluetooth transceiver, a wireless cellular telephony transceiver (e.g., 2G, 3G, 4G, 5G), an NFC transceiver, or another wireless protocol to connect the data processing system 1100 with another device, external component, or a network and receive stored instructions, data, tokens, etc.

Additional components, not shown, may also be part of the data processing system 1100, and, in certain embodiments, fewer components than that shown in FIG. 11 may also be used in a data processing system 1100. One or more buses may be used to interconnect the various components shown in FIG. 11.

The techniques shown in the figures can be implemented using code and data stored and executed on one or more computing devices (e.g., client devices, servers, etc.). Such computing devices store and communicate (internally and/or with other computing devices over a network) code and data using machine-readable media, such as machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such computing devices typically include a set of one or more processors coupled to one or more other components, such as one or more storage devices, user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given computing device typically stores code and/or data for execution on the set of one or more processors of that computing device. Of course, one or more parts of an embodiment of the invention may be implemented using different combinations of software, firmware, and/or hardware.

In the preceding description, numerous specific details are set forth. However, it is understood that embodiments of the invention may be practiced without these specific details. In other instances, well-known circuits, structures, and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the preceding description and the claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method, comprising:
    performing an off-chain registration process for a domain name with an off-chain domain registrar, the off-chain registration process including verifying and reserving the domain name with the off-chain domain registrar accredited by the Internet Corporation for Assigned Names and Numbers (ICANN);
    responsive to the off-chain registration process, performing an on-chain registration process for the domain name with a domain registrar blockchain, wherein an on-chain asset for the domain name is stored at the domain registrar blockchain, and wherein the on-chain asset enables a controller relationship over the domain name;
    receiving a first request from a client device, the first request to access a webpage using the domain name;
    determining that a domain name associated with the webpage is stored in the domain registrar blockchain;
    generating a first blockchain query based on the first request, the first blockchain query for querying the domain registrar blockchain;
    sending the first blockchain query to the domain registrar blockchain, the domain registrar blockchain storing domain name registration data in smart contracts in the domain registrar blockchain;
    receiving a nameserver identifier from the domain registrar blockchain;

retrieving a DNS record for the domain name associated with the webpage using the received nameserver identifier; and providing information from the retrieved DNS record to the client device for accessing the webpage.

2. The method of claim 1, wherein retrieving the DNS record for the webpage using the received nameserver identifier comprises:

generating, by the nameserver, a second blockchain query including the received nameserver identifier;

sending the second blockchain query to a DNS resolver blockchain, the DNS resolver blockchain storing DNS records in smart contracts in the DNS resolver blockchain; and receiving the DNS record for the webpage from the DNS resolver blockchain.

3. The method of claim 2, wherein the DNS resolver blockchain for retrieving the DNS record for the webpage is designated by the domain registrar blockchain.

4. The method of claim 1, wherein generating the first blockchain query based on the first request comprises:

translating a nameserver lookup request of a first request type to the first blockchain query of a second request type.

5. The method of claim 1, wherein the nameserver receives the first request responsive to a forward lookup process identifying the nameserver as an authoritative nameserver for the domain name.

6. The method of claim 1, wherein performing the on-chain registration process for the domain name with the domain registrar blockchain further comprises:

sending a blockchain transaction to the domain registrar blockchain, wherein the blockchain transaction causes the domain registrar blockchain to mint the on-chain asset for the domain name, store the on-chain asset to a digital wallet associated with a user, and store a mapping between the domain name and the digital wallet in a smart contract.

7. A non-transitory machine-readable storage medium that provides instructions that, when executed by a processor, cause said processor to perform operations comprising:

performing an off-chain registration process for a domain name with an off-chain domain registrar, the off-chain registration process including verifying and reserving the domain name with the off-chain domain registrar accredited by the Internet Corporation for Assigned Names and Numbers (ICANN);

responsive to the off-chain registration process, performing an on-chain registration process for the domain name with a domain registrar blockchain, wherein an on-chain asset for the domain name is stored at the domain registrar blockchain, and wherein the on-chain asset enables a controller relationship over the domain name;

receiving a first request from a client device, the first request to access a webpage using the domain name;

determining that a domain name associated with the webpage is stored in the domain registrar blockchain;

generating a first blockchain query based on the first request, the first blockchain query for querying the domain registrar blockchain;

sending the first blockchain query to the domain registrar blockchain, the domain registrar blockchain storing domain name registration data in smart contracts in the domain registrar blockchain;

receiving a nameserver identifier from the domain registrar blockchain;

retrieving a DNS record for the domain name associated with the webpage using the received nameserver identifier; and providing information from the retrieved DNS record to the client device for accessing the webpage.

8. The non-transitory machine-readable storage medium of claim 7, wherein retrieving the DNS record for the webpage using the received nameserver identifier comprises:

generating, by the nameserver, a second blockchain query including the received nameserver identifier;

sending the second blockchain query to a DNS resolver blockchain, the DNS resolver blockchain storing DNS records in smart contracts in the DNS resolver blockchain; and receiving the DNS record for the webpage from the DNS resolver blockchain.

9. The non-transitory machine-readable storage medium of claim 8, wherein the DNS resolver blockchain for retrieving the DNS record for the webpage is designated by the domain registrar blockchain.

10. The non-transitory machine-readable storage medium of claim 7, wherein generating the first blockchain query based on the first request comprises:

translating a nameserver lookup request of a first request type to the first blockchain query of a second request type.

11. The non-transitory machine-readable storage medium of claim 7, wherein the nameserver receives the first request responsive to a forward lookup process identifying the nameserver as an authoritative nameserver for the domain name.

12. The non-transitory machine-readable storage medium of claim 7, wherein performing the on-chain registration process for the domain name with the domain registrar blockchain further comprises:

sending a blockchain transaction to the domain registrar blockchain, wherein the blockchain transaction causes the domain registrar blockchain to mint the on-chain asset for the domain name, store the on-chain asset to a digital wallet associated with a user, and store a mapping between the domain name and the digital wallet in a smart contract.

13. An apparatus, comprising:

a processor; and a non-transitory machine-readable storage medium coupled with the processor, the non-transitory machine-readable storage medium storing instructions that, when executed by the processor, cause said processor to perform the following operations:

perform an off-chain registration process for a domain name with an off-chain domain registrar, the off-chain registration process including verifying and reserving the domain name with the off-chain domain registrar accredited by the Internet Corporation for Assigned Names and Numbers (ICANN);

responsive to the off-chain registration process, perform an on-chain registration process for the domain name with a domain registrar blockchain, wherein an on-chain asset for the domain name is stored at the domain registrar blockchain, and wherein the on-chain asset enables a controller relationship over the domain name;

receive a first request from a client device, the first request to access a webpage using the domain name;

determine that a domain name associated with the webpage is stored in the domain registrar blockchain;

generate a first blockchain query based on the first request, the first blockchain query for querying the domain registrar blockchain;

send the first blockchain query to the domain registrar blockchain, the domain registrar blockchain storing domain name registration data in smart contracts in the domain registrar blockchain;

receive a nameserver identifier from the domain registrar blockchain;

retrieve a DNS record for the domain name associated with the webpage using the received nameserver identifier; and provide information from the retrieved DNS record to the client device for accessing the webpage.

14. The apparatus of claim 13, wherein retrieving the DNS record for the webpage using the received nameserver identifier further causes said processor to:

generate, by the nameserver, a second blockchain query including the received nameserver identifier;

send the second blockchain query to a DNS resolver blockchain, the DNS resolver blockchain storing DNS records in smart contracts in the DNS resolver blockchain; and receive the DNS record for the webpage from the DNS resolver blockchain.

15. The apparatus of claim 14, wherein the DNS resolver blockchain for retrieving the DNS record for the webpage is designated by the domain registrar blockchain.

16. The apparatus of claim 13, wherein generating the first blockchain query based on the first request further causes said processor to:

translate a nameserver lookup request of a first request type to the first blockchain query of a second request type.

17. The apparatus of claim 13, wherein the nameserver receives the first request responsive to a forward lookup process identifying the nameserver as an authoritative nameserver for the domain name.

18. The apparatus of claim 13, wherein performing the on-chain registration process for the domain name with the domain registrar blockchain further causes said processor to perform the following:

send a blockchain transaction to the domain registrar blockchain, wherein the blockchain transaction causes the domain registrar blockchain to mint the on-chain asset for the domain name, store the on-chain asset to a digital wallet associated with a user, and store a mapping between the domain name and the digital wallet in a smart contract.

* * * * *